Sept. 15, 1964    F. T. PISANO    3,148,755
POSITIVE CLUTCH WITH INTERMESHING GEAR TEETH
Filed Sept. 26, 1962    2 Sheets-Sheet 1
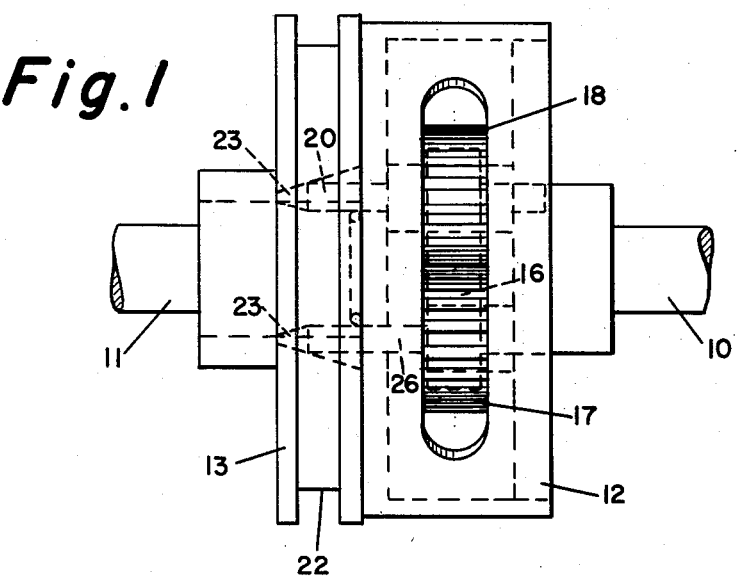
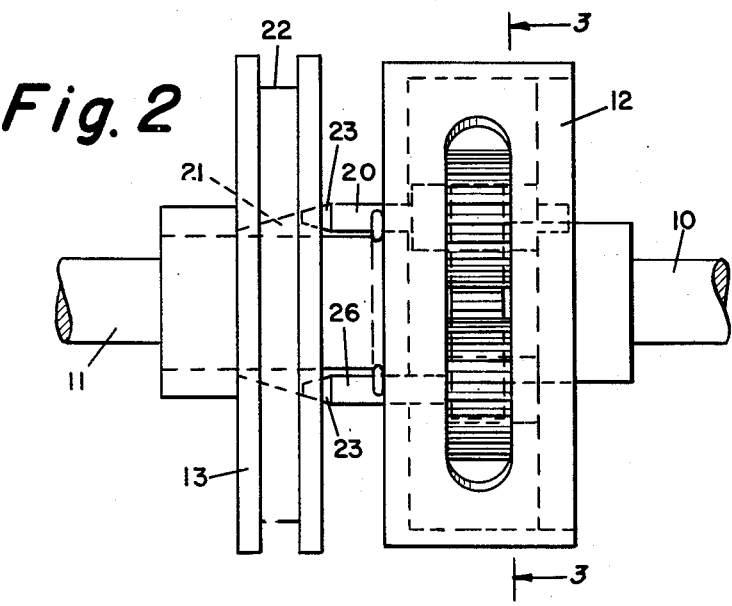
INVENTOR.
FRANK T. PISANO
BY
ATTORNEYS.

Sept. 15, 1964        F. T. PISANO        3,148,755
POSITIVE CLUTCH WITH INTERMESHING GEAR TEETH
Filed Sept. 26, 1962        2 Sheets-Sheet 2
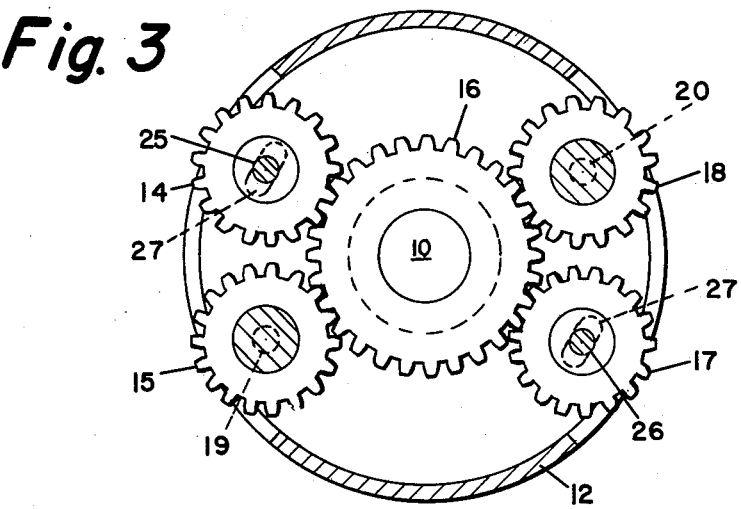
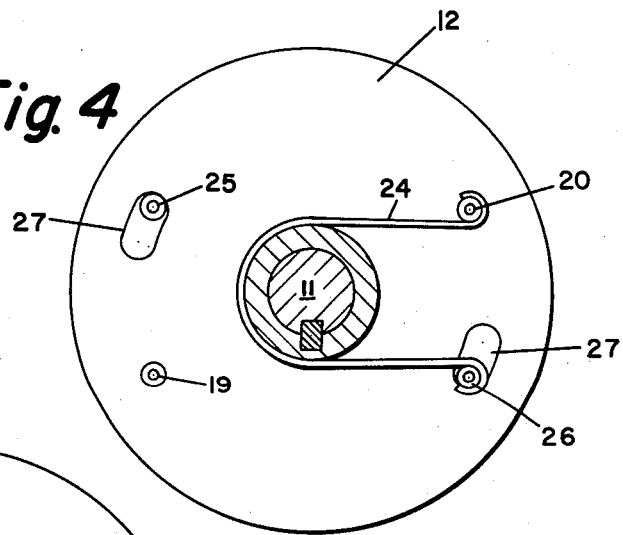
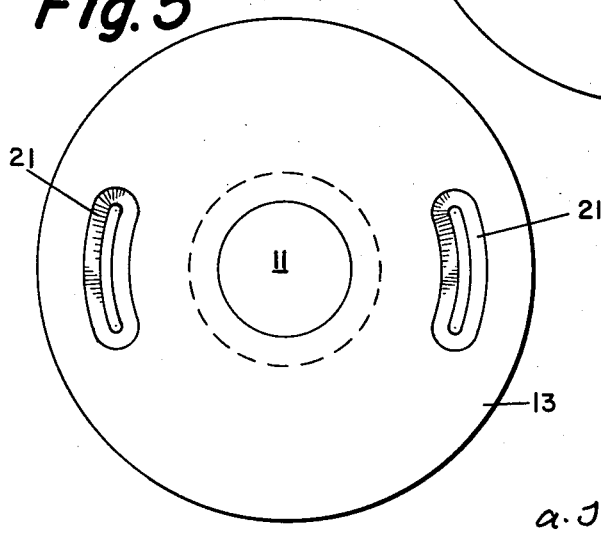
INVENTOR.
FRANK T. PISANO
ATTORNEYS 3,148,755
POSITIVE CLUTCH WITH INTERMESHING
GEAR TEETH
Frank T. Pisano, Philadelphia, Pa., assignor to the United States of America as represented by the Secretary of the Army
Filed Sept. 26, 1962, Ser. No. 227,638
2 Claims. (Cl. 192—71)
(Granted under Title 35, U.S. Code (1952), sec. 266)

The invention described herein may be manufactured and used by or for the Government for governmental purposes without the payment to me of any royalty thereon.

This invention relates to a clutch and has for an object to provide a device of this sort which is compact, and requires less force for shifting.

Specifically this has been accomplished with a sun gear continually engaging opposed pairs of planetary gears with one shaft fixed to the sun gear and a casing enclosing said gears fixed to an opposite shaft. A slidable member on one of said shafts shifts one pair of planetary gears into and out of engagement with the other pair of planetary gears. When said pairs of planetaries engage one another the clutch is in for driving one shaft from the other.

Referring to the drawings:

FIG. 1 is a top plan view of the clutch when engaged;

FIG. 2 is a top plan view of the clutch in its disengaged position;

FIG. 3 is a section on the line 3—3 of FIG. 2;

FIG. 4 is left side view of the casing of FIG. 2 with the shiftable member removed;

FIG. 5 a right side view of the shiftable member showing its arcuate slots with sloping side and end walls.

In FIG. 1 either shaft 10 or 11 may be the driven and the other the driving shaft. The casing 12 contains the clutch actuated by a shiftable member 13 for moving the clutch elements to an engaged position. Within casing 12 is a sun gear 16 continually engaged by planetary gears 14, 15, 17 and 18. When gears 14 and 15 do not mesh with one another the clutch is in an open or disengaged position. When the planetary gears 14 and 15 and gears 17 and 18 mesh with each other as well as with the sun gear the clutch is then engaged and shafts 10 and 11 are directly connected through sun gear 16 and the planetary gears 15 and 18, and their shafts which are journaled in the casing 12, causing the casing 12 to rotate as the sun gear with its planets must rotate with shaft 10.

Additional planetary gears 17 and 18 make the embodiment illustrated better able to take heavy loads. A spring 24 shown in FIG. 4 urges shiftable planetary gear 17 and its shaft 26 away from planet gear 18 and its shaft which are fixedly journaled in the casing 12. A similar spring may cooperate with the shafts of gears 14 and 15 for the same purpose.

The shiftable member 13 is slidable with shaft 11 and has peripheral groove 22 to be engaged by a member not shown which slides this member 13 to move planetary gears 14 and 17 into mesh with the fixed planet gears 15 and 18 while all remain in mesh with sun gear 16. Of course as soon as the planet gears mesh with each other the shafts 10 and 11 become connected through the shafts 19 and 20 of planet gears 15 and 18 having their shafts journaled in the wall of casing 12. A somewhat U shaped leaf spring may tend to separate the shafts of gears 14 and 15 to move planet gears 14 and 15 out of mesh with each other when member 13 is shifted to the left in FIG. 1 or away from casing 12.

The shaft on which each planet gear is mounted projects through the left side wall of casing 12 and into the arcuate slots 21 in the member 13 as shown in FIGS. 1 and 2. The shafts 25 and 26 of the shiftable planetaries move in openings 27 in the left wall of the casing as shown in FIG. 4. The end portion of each such shaft is tapered for a better surface engagement with the inclined end walls of slots 21 in member 13. The longitudinal side walls of these slots 21 are also tapered but primarily to provide clearance for the tapered end portions of the planet shafts projecting into member 13 and its arcuate slots 21. The planet gear 17 is 180° opposite gear 14 and gear 18 is opposite gear 15 as shown in FIG. 3. Since these planet gears remain always in mesh with sun gear moving one planet gear toward or from the planet gear with which it meshes when the clutch is engaged and the shafts are connected has the same effect upon its opposite planet gear. The use of four instead of two planet gears reduces the load each planet must transmit when the clutch is in and the planets all rotate with the sun gear 16 and casing 12. A second spring 24 (not shown) may be applied to the opposite pair of planetary gears if desired.

Among the advantages of this invention may be mentioned its compactness for transmission of a given load. For example this clutch when made for a given load was found to be much smaller in size than commercial clutches on the market for the same load. Another advantage is that the force required to engage this same clutch was found to be $\frac{1}{8}$ to $\frac{1}{10}$ the force necessary to accomplish the same in those commercial clutches mentioned. One factor contributing to compactness in this clutch is the small amplitude of motion needed by the member 13. A factor contributing to the small actuating force needed is the absence of heavy friction in the clutch engagement and instead the use of only the small friction in rolling gears on one another.

I claim:

1. In a clutch having input and output shafts, a sun gear on one of said shafts, a shiftable member on the other of said shafts and having an arcuate slot, said slot having tapered edge portions, a pair of planetary gears engaged with said sun gear, a housing rotatable with said other shaft and substantially enclosing said gears, one of said planetary gears having a shaft with one end thereof fixed to said housing, said housing having an end wall with a slot therein, the other of said planetary gears having a shaft with one end extending into said housing end wall slot, the other ends of said planetary gear shafts each being tapered and engaged in opposed ends of said tapered arcuate slot, whereby movement of said shiftable member toward said one shaft will move said planetary gears into engagement with one another while each remains in engagement with said sun gear.

2. The combination set forth in claim 1 wherein a U-shaped spring normally urges said planetary shafts away from each other.

References Cited in the file of this patent
UNITED STATES PATENTS

| 2,423,979 | Jenson | July 15, 1947 |
| 3,101,827 | Showalter | Aug. 27, 1963 |

FOREIGN PATENTS

| 308,495 | Great Britain | Mar. 28, 1929 |